United States Patent
Agnew et al.

(10) Patent No.: US 9,809,219 B2
(45) Date of Patent: Nov. 7, 2017

(54) SYSTEM FOR ACCOMMODATING A PEDESTRIAN DURING AUTONOMOUS VEHICLE OPERATION

(71) Applicant: Continental Automotive Systems, Inc., Auburn Hills, MI (US)

(72) Inventors: David Leslie Agnew, Clarkston, MI (US); Graham Lanier Fletcher, North Augusta, SC (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 77 days.

(21) Appl. No.: 14/603,427

(22) Filed: Jan. 23, 2015

(65) Prior Publication Data

US 2015/0210279 A1 Jul. 30, 2015

Related U.S. Application Data

(60) Provisional application No. 61/933,110, filed on Jan. 29, 2014.

(51) Int. Cl.
| | |
|---|---|
| *B60W 30/09* | (2012.01) |
| *B60W 10/184* | (2012.01) |
| *B60W 10/20* | (2006.01) |
| *B60W 30/12* | (2006.01) |
| *B60W 30/14* | (2006.01) |

(52) U.S. Cl.
CPC .......... *B60W 30/09* (2013.01); *B60W 10/184* (2013.01); *B60W 10/20* (2013.01); *B60W 30/12* (2013.01); *B60W 30/143* (2013.01); *B60W 2520/10* (2013.01); *B60W 2550/10* (2013.01); *B60W 2710/18* (2013.01); *B60W 2710/20* (2013.01); *B60W 2720/10* (2013.01)

(58) Field of Classification Search
None
See application file for complete search history.

(56) References Cited

U.S. PATENT DOCUMENTS

| | | | |
|---|---|---|---|
| 8,489,281 B2 * | 7/2013 | Reichel | B62D 15/0265 |
| | | | 701/301 |
| 9,229,453 B1 * | 1/2016 | Lee | G05D 1/0214 |
| 9,318,023 B2 * | 4/2016 | Moshchuk | G08G 1/167 |

(Continued)

FOREIGN PATENT DOCUMENTS

| | | |
|---|---|---|
| CN | 103298666 A | 9/2013 |
| DE | 102005023832 A1 | 11/2006 |

(Continued)

OTHER PUBLICATIONS

Japanese Office Action dated Feb. 1, 2016.

(Continued)

*Primary Examiner* — Truc M Do

(57) ABSTRACT

A collision avoidance system for a vehicle includes an electronic brake system capable of applying wheel brakes to decelerate the vehicle, a steering system capable of changing a steering angle for the vehicle, and a controller. The controller instructions for performing a pedestrian avoidance maneuver including at least one of steering the vehicle to the maximum available separation distance and braking the vehicle to the maximum safe speed while the vehicle is passing the pedestrian.

16 Claims, 1 Drawing Sheet

(56) References Cited

U.S. PATENT DOCUMENTS

| | | | |
|---|---|---|---|
| 2003/0163240 A1* | 8/2003 | Egami | B60K 26/021 701/96 |
| 2003/0187578 A1* | 10/2003 | Nishira | B60T 7/16 701/301 |
| 2004/0155811 A1* | 8/2004 | Albero | B60K 31/0008 342/70 |
| 2004/0193374 A1* | 9/2004 | Hac | B60K 31/0008 701/301 |
| 2007/0080825 A1* | 4/2007 | Shiller | B60R 21/013 340/903 |
| 2008/0046145 A1* | 2/2008 | Weaver | B60T 7/22 701/41 |
| 2008/0097699 A1* | 4/2008 | Ono | B60R 21/0134 701/300 |
| 2008/0273750 A1* | 11/2008 | Fujimoto | G06K 9/00362 382/103 |
| 2009/0143951 A1* | 6/2009 | Takahashi | B60W 30/02 701/70 |
| 2009/0143987 A1* | 6/2009 | Bect | B60R 21/0134 701/301 |
| 2009/0192710 A1* | 7/2009 | Eidehall | B62D 15/0265 701/301 |
| 2011/0106361 A1* | 5/2011 | Staempfle | B62D 15/0265 701/23 |
| 2011/0178710 A1* | 7/2011 | Pilutti | B60T 7/22 701/301 |
| 2011/0288774 A1 | 11/2011 | Bengtsson et al. | |
| 2013/0054128 A1* | 2/2013 | Moshchuk | G08G 1/167 701/301 |
| 2013/0218396 A1* | 8/2013 | Moshchuk | B60W 50/08 701/25 |
| 2014/0163859 A1* | 6/2014 | Tsuchida | G01S 13/72 701/301 |
| 2015/0183431 A1* | 7/2015 | Nanami | B60W 40/04 701/301 |
| 2015/0210279 A1* | 7/2015 | Agnew | B60W 30/09 701/48 |

FOREIGN PATENT DOCUMENTS

| | | |
|---|---|---|
| EP | 2298626 A1 | 3/2011 |
| EP | 2338758 A1 | 6/2011 |
| EP | 2388756 A1 | 11/2011 |
| JP | 4305186 A | 4/1991 |
| JP | 2006224740 A | 8/2006 |
| JP | 2006264466 A | 10/2006 |
| JP | 2008179251 A | 8/2008 |
| JP | 2009202676 A | 9/2009 |
| JP | 201097261 A | 4/2010 |
| JP | 2011108016 A | 6/2011 |
| JP | 20132173416 A | 9/2013 |
| KR | 20100072779 A1 | 7/2010 |
| WO | 2012114478 A1 | 8/2012 |

OTHER PUBLICATIONS

Franke Uwe et al., Making Bertha See, 2013 IEEE International Conference on Computer vision Workshops, IEEE, Dec. 2, 2013, pp. 214-221, XP032575759.
JP 2009 202676 English Abstract.
DE 10 2005 023832 English Machine Translation—Google Patents.
KR 2010 0072779 English Abstract.

* cited by examiner

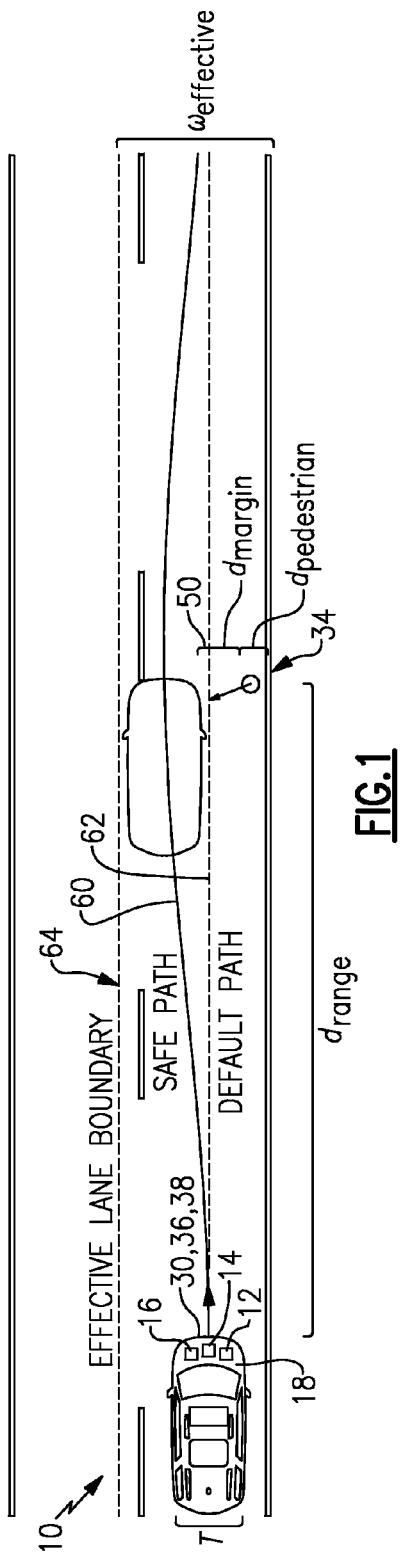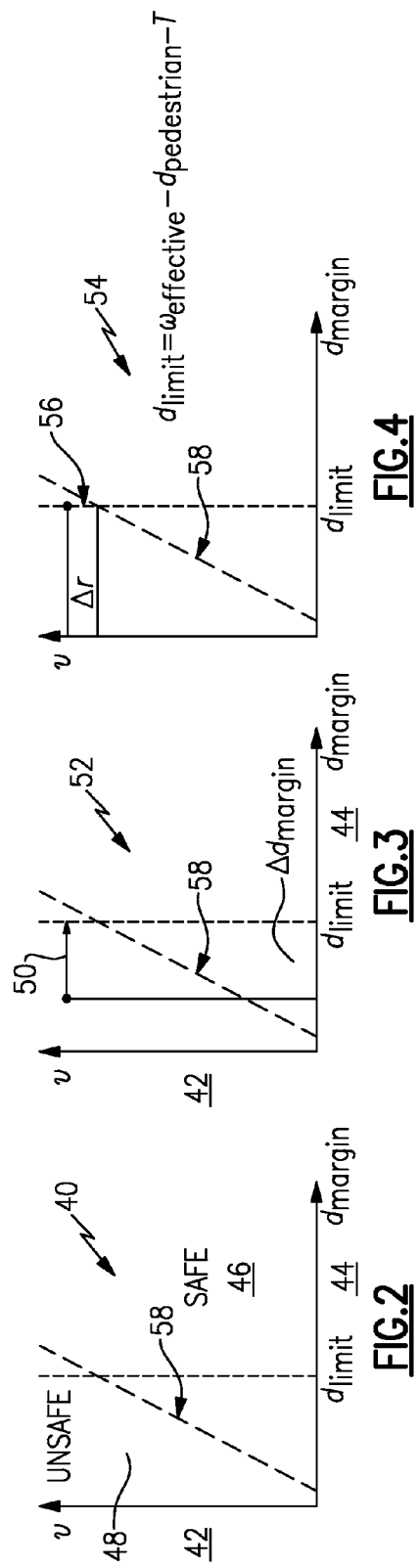

SYSTEM FOR ACCOMMODATING A PEDESTRIAN DURING AUTONOMOUS VEHICLE OPERATION

CROSS REFERENCE TO RELATED APPLICATION

This application claims priority to U.S. Provisional Application No. 61/933,110 filed on Jan. 29, 2014.

TECHNICAL FIELD

The present disclosure relates to automotive vehicles, and more particularly to an autonomous vehicle operation system.

BACKGROUND

Advancements in sensor technology have led to the ability to improve safety systems for vehicles. Arrangements and methods for detecting and avoiding collisions are becoming available. Such systems use sensors located on the vehicle to detect an oncoming collision. The systems may warn the driver of various driving situation to prevent or minimize collisions. Such systems are especially useful for increasing safety in vehicles which operate under autonomous or semi-autonomous conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A collision avoidance system for a vehicle includes an electronic brake system capable of applying wheel brakes to decelerate the vehicle, a steering system capable of changing a steering angle for the vehicle, and a controller. The controller includes instructions for detecting an object proximate to a vehicle with at least one sensor and analyzing data from the sensors with a controller to determine if the object detected is a pedestrian proximate to the vehicle. The controller further includes instructions for determining a maximum separation distance from the pedestrian while maintain the vehicle within a current lane of travel and determining a maximum safe speed for the vehicle to pass the pedestrian based upon the maximum separation distance available. The controller further includes instructions for performing a pedestrian avoidance maneuver including at least one of steering the vehicle to the maximum separation distance and braking the vehicle to a maximum safe speed while the vehicle is passing the pedestrian.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein:

FIG. 1 is a schematic illustration of a top view of a vehicle utilizing a safety system of the present invention;

FIG. 2 is an example relationship between speed and distance from an object;

FIG. 3 is a graphical illustration of an example step of a disclosed method of for passing a pedestrian;

FIG. 4 is a graphical illustration of another example step of the disclosed method for passing a pedestrian.

DETAILED DESCRIPTION

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a driver assistance system, in particular a collision avoidance system 12 that may be used to brake and/or steer a vehicle 10 during autonomous and semi-autonomous vehicle operations.

The collision avoidance system 12 may include a camera 30 mounted to provide a view of a driving direction for the vehicle 10. The camera 30 may be a monocular camera, binocular camera, or another type of sensing device capable of providing a view of the proximate area around and the travelling path of the vehicle 10. A controller 18 may be connected to the camera 30 to analyze the image/data and identify objects 34 within the image that may be obstacles for the vehicle 10. In addition to the camera 30 the collision avoidance system 12 may use other systems and sensors to assist in identifying objects 34. Such systems and sensors may include, but are not limited to: proximity sensors 36, LIDAR, RADAR, ultrasound, GPS 38, radio sensors, a power steering system 14, and an electronic brake system (EBS) 16, etc. A common or separate controller 18 may be used by the systems 12, 14, 16.

The collision avoidance system 12 determines when a braking and/or steering event needs to occur, whether the vehicle 10 is travelling in a forward or a reverse direction, to avoid an object and/or a pedestrian. The collision avoidance system 12, steering system 14, EBS 16, or a similar system determines a probability of collision when an obstacle is detected. If the probability of collision is above a predetermined threshold, at least one vehicle collision avoidance action is provided. The collision avoidance action can include actuation of a warning to alert a driver when an obstacle is detected and/or modification of a vehicle speed or current path to avoid the obstacle.

Referring to FIG. 2 with continued reference to FIG. 1, graph 40 illustrates a relationship between vehicle speed 48 and distance from an identified object 34. A safe zone 46 is separated from an unsafe zone depending on velocity 42. A boundary 58 provides a graphical illustration of the relationship between an acceptable separation distance 44 for a current velocity 42. As velocity of the vehicle increases, the safe distance from the identified object also increases. As the velocity 42 decreases, the acceptable safe distance from the object 34 decreases. Accordingly, upon approaching an object, the vehicle 10 may either reduce velocity or increase lateral distance from the object.

If the system 12 detects that a collision with an obstacle seems likely, one avoidance action may be to use the EBS 16 to apply the brakes 20 to prevent the collision and/or the steering system 14 to steer the vehicle 10 away from the obstacle. For example, the collision avoidance system 12 may detect and identify an object as a pedestrian. In such situations, safety can be increased when passing a roadside pedestrian during autonomous vehicle operation by adjusting the lateral separation and vehicle speed.

Referring to FIG. 3 with continued reference to FIG. 1, upon detecting a pedestrian 34 alongside or in the current lane, the vehicle 10 first adjusts its lateral position 50 to provide maximum separation distance indicated at 50 in graph 52 from the pedestrian without incurring additional danger from oncoming traffic or vehicles in adjacent lanes. As appreciated, lateral movement of the vehicle within a given lane is limited and therefore at some vehicle speeds 42 lateral movement as indicated at 50 is not sufficient to create an acceptable lateral separation distance from the pedestrian given the vehicles current speed.

Referring to FIG. 4, with continued reference to FIGS. 2 and 3, if sufficient separation distance is not available to move to the boundary 58, then the speed may be decreased. In this example, the vehicle speed exceeds the acceptable limit for the available separation distance. Accordingly, when the speed is determined to be too high for the lateral separation 50, the vehicle 10 is automatically slowed down an amount indicated at 56 in graph 54 before passing the pedestrian. The amount that the speed is reduced is dependent on the separation distance 50 available to the vehicle 10. For lesser separations distances 50, a greater reduction in vehicle speed 56 would be implemented. After the pedestrian 34 has been passed, the vehicle 10 can re-center itself in the lane and resume the previous speed.

Referring to FIG. 1, a first path 60 is shown that represents a vehicle path required to maintain a desired distance with minimal reduction to speed. A second path 62 is shown that relies only on reducing velocity to bring the vehicle to desired operating condition for passing the pedestrian 34. An "effective lane boundary" 64 is determined based on a set of predefined criteria that considers current road usage restrictions and requirements such as for example, if local rules allow a solid lane boundary be crossed and what minimum separation is desired between vehicles in an adjacent lane.

Once the vehicle 10 has moved laterally to the edge of the effective lane 64, the collision avoidance system 12 may additionally slow the vehicle 10 based on the determined current relationship as is illustrated in FIGS. 2, 3 and 4. The maximum speed of the vehicle is determined based on the expected classification in the two regions shown in the FIG. 2. The slope and offset of the classification boundary 58 is determined based on prior studies of pedestrian behavior. If the vehicle 10 has already planned to shift laterally to the limit ($d_{limit}$), it can additionally lower the speed of the vehicle by $\Delta v$ until the safe zone 46 is reached.

Being proactive in such a situation by steering away within the lane and minimizing speed if necessary mimics a human driver's behavior and helps minimize the risk associated with unexpected pedestrian actions. For example, it may appear that given the trajectory of a cyclist, a collision won't occur, but perhaps the cyclist is unaware of the approaching vehicle 10 and shifts laterally into the vehicle's path. Additionally, a pedestrian 34 could always trip and fall into the path of a vehicle 10. By taking into account these scenarios ahead of time, the vehicle 10 can avoid unexpected pedestrian actions.

While the best modes for carrying out the invention have been described in detail, the true scope of the disclosure should not be so limited, since those familiar with the art to which this invention relates will recognize various alternative designs and embodiments for practicing the invention within the scope of the appended claims.

What is claimed is:

1. A method of controlling a vehicle comprising:
   detecting an object proximate to a vehicle with at least one sensor;
   analyzing data from the at least one sensor with a controller to determine when the object detected is a pedestrian proximate to the vehicle;
   determining a maximum separation distance from the pedestrian while maintaining the vehicle within a current lane of travel;
   determining a maximum safe speed for the vehicle to pass the pedestrian based upon the maximum separation distance available;
   performing a pedestrian safety zone maintenance maneuver comprising adjusting a lateral position of the vehicle to the maximum separation distance prior to application of a vehicle brake followed by slowing the vehicle to the maximum safe speed for the maximum separation distance possible while maintaining the vehicle within the current lane of travel when a speed of the vehicle is above the maximum safe speed of the vehicle while the vehicle is passing the pedestrian.

2. The method of claim 1, further comprising steering and accelerating the vehicle to return the vehicle to a previous lateral location within the current lane of travel and the vehicle speed prior to the pedestrian avoidance maneuver.

3. The method of claim 1, wherein determining a maximum separation distance from the pedestrian further includes determining a minimum safe distance from the vehicle from any traffic in an adjacent lane.

4. The method of claim 3, wherein the minimum safe distance from a vehicle in an adjacent lane is increased when the adjacent lane is an oncoming traffic lane.

5. The method of claim 3, wherein the minimum safe distance is increased when traffic is detected in the adjacent traffic lane.

6. The method of claim 1, including determining a possible path of the pedestrian and determining at least one of the maximum separation distance from the pedestrian and maximum safe speed based in part on the determined possible path of the pedestrian.

7. A collision avoidance system for a vehicle comprising:
   an electronic brake system capable of applying wheel brakes to decelerate the vehicle;
   a steering system capable of changing a steering angle for the vehicle; and
   a controller including instructions for:
      detecting an object proximate to a vehicle with at least one sensor;
      analyzing data from the at least one sensor with a controller to determine when the object detected is a pedestrian proximate to the vehicle;
      determining a maximum separation distance from the pedestrian while maintaining the vehicle within a current lane of travel;
      determining a maximum safe speed for the vehicle to pass the pedestrian based upon the maximum separation distance available; and
      performing a pedestrian avoidance maneuver including adjusting a lateral position of the vehicle to the maximum separation distance followed by slowing the vehicle to the maximum safe speed corresponding to the maximum separation distance possible while maintaining the vehicle within the current lane of travel when a speed of the vehicle is above the maximum safe speed of the vehicle while the vehicle is passing the pedestrian.

8. The vehicle of claim 7, wherein the controller further includes instructions for: steering and accelerating the vehicle to return the vehicle to a previous lateral location within the current lane of travel and the vehicle speed prior to the pedestrian avoidance maneuver.

9. The vehicle of claim 7, wherein determining the maximum separation distance from the pedestrian further includes determining a minimum safe distance from the vehicle from any traffic in an adjacent lane.

10. The vehicle of claim 9, wherein the minimum safe distance from vehicles in an adjacent lane is increased when the adjacent lane is an oncoming traffic lane.

11. The vehicle of claim 9, wherein the minimum safe distance is increased when traffic is detected in the adjacent traffic lane.

12. An autonomous vehicle control system comprising:
an electronic brake system capable of applying wheel brakes to decelerate the vehicle;
a steering system capable of changing a steering angle for the vehicle; and
a controller including instructions for:
  detecting an object proximate to a vehicle with at least one sensor;
  analyzing data from the at least one sensor with a controller to determine when the object detected is a pedestrian proximate to the vehicle;
  determining a maximum separation distance from the pedestrian while maintaining the vehicle within a current lane of travel;
  determining a maximum safe speed for the vehicle to pass the pedestrian based upon the maximum separation distance available; and
  performing a pedestrian avoidance maneuver including adjusting a lateral position of the vehicle to the maximum separation distance followed by slowing the vehicle to the maximum safe speed while maintaining the vehicle within the current lane of travel when a speed of the vehicle is above the maximum safe speed of the vehicle while the vehicle is passing the pedestrian.

13. The vehicle of claim 12, wherein the controller further includes instructions for: steering and accelerating the vehicle to return the vehicle to a previous lateral location within the current lane of travel and the vehicle speed prior to the pedestrian avoidance maneuver.

14. The vehicle of claim 12, wherein determining the maximum separation distance from the pedestrian further includes determining a minimum safe distance from the vehicle from any traffic in an adjacent lane.

15. The vehicle of claim 14, wherein the minimum safe distance from a vehicle in an adjacent lane is increased when the adjacent lane is an oncoming traffic lane.

16. The vehicle of claim 14, wherein the minimum safe distance is increased when traffic is detected in the adjacent traffic lane.

* * * * *